(12) United States Patent
Lin

(10) Patent No.: US 8,283,970 B2
(45) Date of Patent: Oct. 9, 2012

(54) NEGATIVE CHARGE PUMP WITH CURRENT PROTECTION

(75) Inventor: Hong Wu Lin, Shenzhen (CN)

(73) Assignee: STMicroelectronics (Shenzhen) R&D Co. Ltd., Shenzhen (CN)

(*) Notice: Subject to any disclaimer, the term of this patent is extended or adjusted under 35 U.S.C. 154(b) by 155 days.

(21) Appl. No.: 12/821,883

(22) Filed: Jun. 23, 2010

(65) Prior Publication Data

US 2011/0074481 A1 Mar. 31, 2011

(30) Foreign Application Priority Data

Sep. 30, 2009 (CN) .................... 2009 1 0174116

(51) Int. Cl.
*G05F 3/02* (2006.01)
*G05F 1/10* (2006.01)
(52) U.S. Cl. ...................................... 327/536
(58) Field of Classification Search .......... 327/536; 363/59–60; 307/109–110
See application file for complete search history.

(56) References Cited

U.S. PATENT DOCUMENTS

| | | | | |
|---|---|---|---|---|
| 5,539,336 A * | 7/1996 | Nguyen et al. | | 326/83 |
| 6,738,271 B2 * | 5/2004 | Umeda | | 363/60 |
| 6,894,542 B2 * | 5/2005 | Prexl et al. | | 327/67 |
| 7,271,642 B2 * | 9/2007 | Chen et al. | | 327/514 |
| 7,724,551 B2 * | 5/2010 | Yanagida et al. | | 363/60 |
| 7,847,621 B2 * | 12/2010 | Oyama et al. | | 327/536 |
| 7,880,530 B2 * | 2/2011 | Ishiyama | | 327/536 |
| 7,990,205 B2 * | 8/2011 | Jung | | 327/536 |
| 8,149,048 B1 * | 4/2012 | Mar | | 327/563 |
| 2002/0053943 A1 * | 5/2002 | Yamasaki et al. | | 327/538 |
| 2007/0210858 A1 * | 9/2007 | Ang | | 327/543 |
| 2008/0007980 A1 * | 1/2008 | Fujiwara | | 363/59 |
| 2008/0157734 A1 * | 7/2008 | Feng et al. | | 323/271 |

* cited by examiner

*Primary Examiner* — Quan Tra
(74) *Attorney, Agent, or Firm* — Gardere Wynne Sewell LLP

(57) ABSTRACT

A charge pump circuit includes a first power transistor selectively actuated by a first control signal to deliver relatively higher amounts of current to a capacitor and a second non-power transistor connected in parallel with the first power transistor and selectively actuated by a second control signal to deliver relatively lower amounts of current to the capacitor. The charge pump circuit includes a pumped voltage output that is sensed to generate a sensed voltage output. A comparison circuit compares the sensed voltage output to a threshold voltage. A logic circuit receives an output of the comparison circuit and enables the first power transistor and disables the second non-power transistor in a first mode of operation if the comparison is not satisfied. The logic circuit further disables the first power transistor and enables the second non-power transistor in a second mode of operation if the comparison is satisfied. The logic circuit returns from the second mode of operation to the first mode of operation after the comparison is subsequently not satisfied.

22 Claims, 5 Drawing Sheets

NEGATIVE CHARGE PUMP WITH CURRENT PROTECTION

PRIORITY CLAIM

This application claims priority from Chinese Application for Patent No. 200910174116.6 filed Sep. 30, 2009, the disclosure of which is hereby incorporated by reference.

BACKGROUND OF THE INVENTION

1. Technical Field of the Invention

The present invention relates generally to negative charge pump circuits and, more particularly, to a current protection scheme for use with such negative charge pump circuits.

2. Description of Related Art

Reference is made to FIG. 1 which shows a circuit diagram for a prior art negative charge pump circuit. An oscillator 10 generates an oscillating reference clock signal which is applied to a non-overlap signal generator 12 outputting a first clock signal 14 and a complementary second clock signal 16. The first and second clock signals 14 and 16 are received by a level shifter 18 which outputs four control signals (C1-C4) 20, 22, 24 and 26 that are applied to the gates of four MOS power transistors 30, 32, 34 and 36, respectively.

The first MOS power transistor 30 is of the PMOS type having its source terminal coupled to a reference voltage (Vdd). The gate of the first MOS transistor 30 receives the first control signal (C1) 20. The second MOS power transistor 32 is of the NMOS type having its source terminal coupled to a ground reference voltage. The gate of the second MOS transistor 32 receives the second control signal (C2) 22. The drains of the first and second MOS transistors 30 and 32 are coupled together and to the first terminal of a first capacitor 40 (referred to as the fly capacitor).

The third MOS power transistor 34 is of the NMOS type having its source terminal coupled to the ground reference voltage. The gate of the third MOS transistor 34 receives the third control signal (C3) 24. The fourth MOS power transistor 36 is of the NMOS type having its source terminal coupled to a negative voltage (Vneg) output 42. The gate of the fourth MOS transistor 36 receives the fourth control signal (C4) 26. The drains of the third and fourth MOS transistors 34 and 36 are coupled together and to the second terminal of the first (fly) capacitor 40.

An output (or load) capacitor 46 is coupled between the negative voltage (Vneg) output 42 and the ground reference voltage.

Reference is now made to FIG. 2 which shows a timing diagram illustrating the control signals for operating the charge pump circuit of FIG. 1. During a first phase of operation 70, the first (C1) and third (C3) control signals 20 and 24 turn on the first and third power transistors 30 and 34. This charges the fly capacitor 40 towards the reference voltage Vdd. In this first phase of operation, the first (C1) control signal 20 is low and the third (C3) control signal 24 is high. The second (C2) and fourth (C4) control signals 22 and 26 are both low (thus shutting off the second and fourth transistors 32 and 36).

During a second phase of operation 72, the second (C2) and fourth (C4) control signals 22 and 26 turn on the second and fourth power transistors 32 and 36. This charges the load capacitor 46 (with the positive side of the fly capacitor 40 being connected the ground reference side of the load capacitor 46), thus producing a negative voltage Vneg at the output 42. In this second phase of operation, the second (C2) control signal 22 is high and the fourth (C4) control signal 26 is high. The first (C1) and third (C3) control signals 20 and 24 are high and low, respectively, (thus shutting off the first and third transistors 30 and 34).

It will be recognized that the control signals C1, C2 and C4 have a same phase relationship and thus may be generated from the first clock signal 14, while the control signal C3 has an opposite phase relationship and thus may be generated from the complementary second clock signal 16. The level shifter 18 applies any necessary level shifting (not explicitly shown in FIG. 2) so that the gate voltages are set so as to fully turn on and fully turn off the power transistors 30, 32, 34 and 36 during circuit operation.

The first and second phases are continuously repeated to pump the output 42 voltage Vneg towards the desired negative reference voltage (-Vdd). Before the output 42 reaches its desired final voltage state (i.e., before Vneg reaches -Vdd), high currents may be experienced in both the first and second transistors 30 and 32 when either is turned on during pumping. For example, a high current may exist in first transistor 30 when charging the fly capacitor 40 during the first phase of operation (C1 low), and a high current may exist in second transistor 32 when charging the load capacitor 46 during the second phase of operation (C3 high). There is a need to provide current protection to the first and second transistors 30 and 32.

SUMMARY OF THE INVENTION

In an implementation, a circuit comprises: a charge pump circuit including a first power transistor selectively actuated by a first control signal to deliver relatively higher amounts of current to a capacitor, the charge pump circuit further including a second non-power transistor connected in parallel with the first power transistor and selectively actuated by a second control signal to deliver relatively lower amounts of current to the capacitor, the charge pump circuit including a pumped voltage output. A voltage sensing circuit is coupled to sense the pumped voltage output and generate a sensed voltage output. A comparison circuit compares the sensed voltage output to a threshold voltage. A logic circuit receives an output of the comparison circuit, the logic circuit enabling the first power transistor and disabling the second non-power transistor if the comparison is not satisfied, and further disabling the first power transistor and enabling the second non-power transistor if the comparison is satisfied.

In another implementation, a method comprises: pumping an output to a pumped voltage level, wherein pumping comprises selectively delivering current to a capacitor through either a first power transistor which delivers relatively higher amounts of current to the capacitor or a second non-power transistor which delivers relatively lower amounts of current to the capacitor; sensing the pumped voltage level and generating a sensed voltage output; comparing the sensed voltage output to a threshold voltage; enabling the first power transistor and disabling the second non-power transistor if the comparison is not satisfied; and disabling the first power transistor and enabling the second non-power transistor if the comparison is satisfied.

In another implementation, a circuit comprises a charge pump circuit including: a first power transistor selectively actuated by a first control signal to deliver relatively higher amounts of current to a first capacitor; a second power transistor selectively actuated by a second control signal to deliver relatively higher amounts of current from the first capacitor to a second capacitor; a third non-power transistor connected in parallel with the first power transistor and selectively actuated by a third control signal to deliver relatively lower amounts of current to the first capacitor; a fourth non-power transistor connected in parallel with the second power transistor and selectively actuated by a fourth control signal to deliver relatively lower amounts of current from the first capacitor to the second capacitor; and a pumped voltage output coupled to the second capacitor. A voltage sensing circuit senses the pumped voltage output and generates a sensed voltage output. A comparison circuit compares the sensed voltage output to a threshold voltage. A logic circuit configures the charge pump for operation in a first mode of operation and second mode of operation responsive to an output of the comparison circuit. The first mode of operation enables the first and second power transistors and disables the third and fourth non-power transistors when the comparison is not satisfied. The second mode of operation disables the first and second power transistors and enables the third and fourth non-power transistors if the comparison is satisfied.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
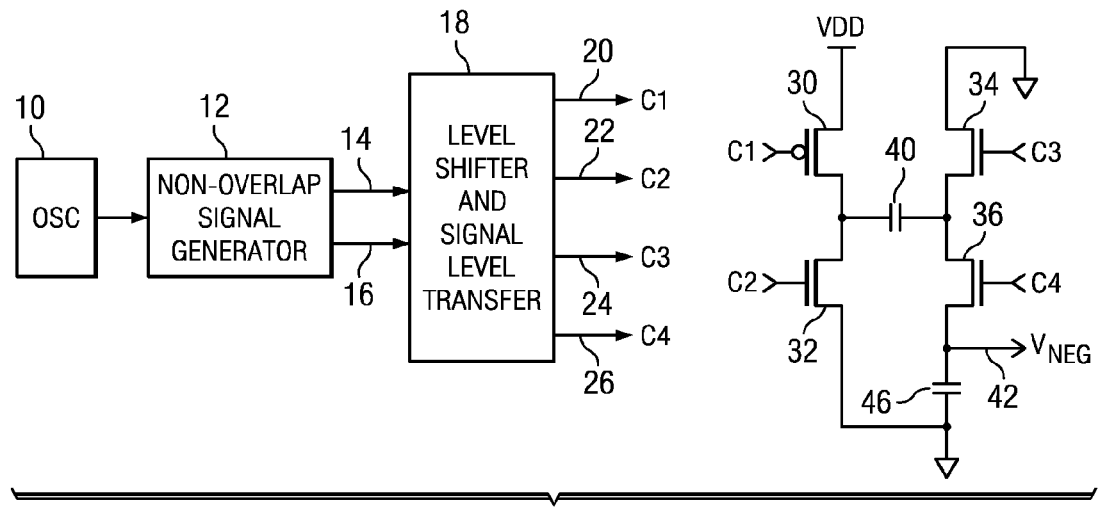
FIG. 1 is a circuit diagram for a prior art negative charge pump circuit.
Figure 2:
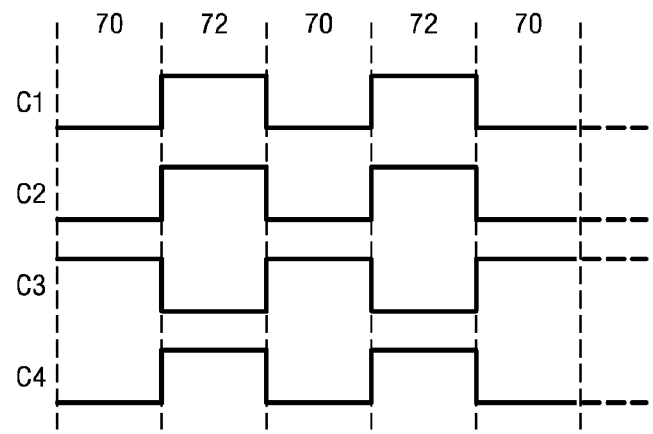
FIG. 2 is a timing diagram illustrating the control signals for the charge pump circuit of FIG. 1.
Figure 3:
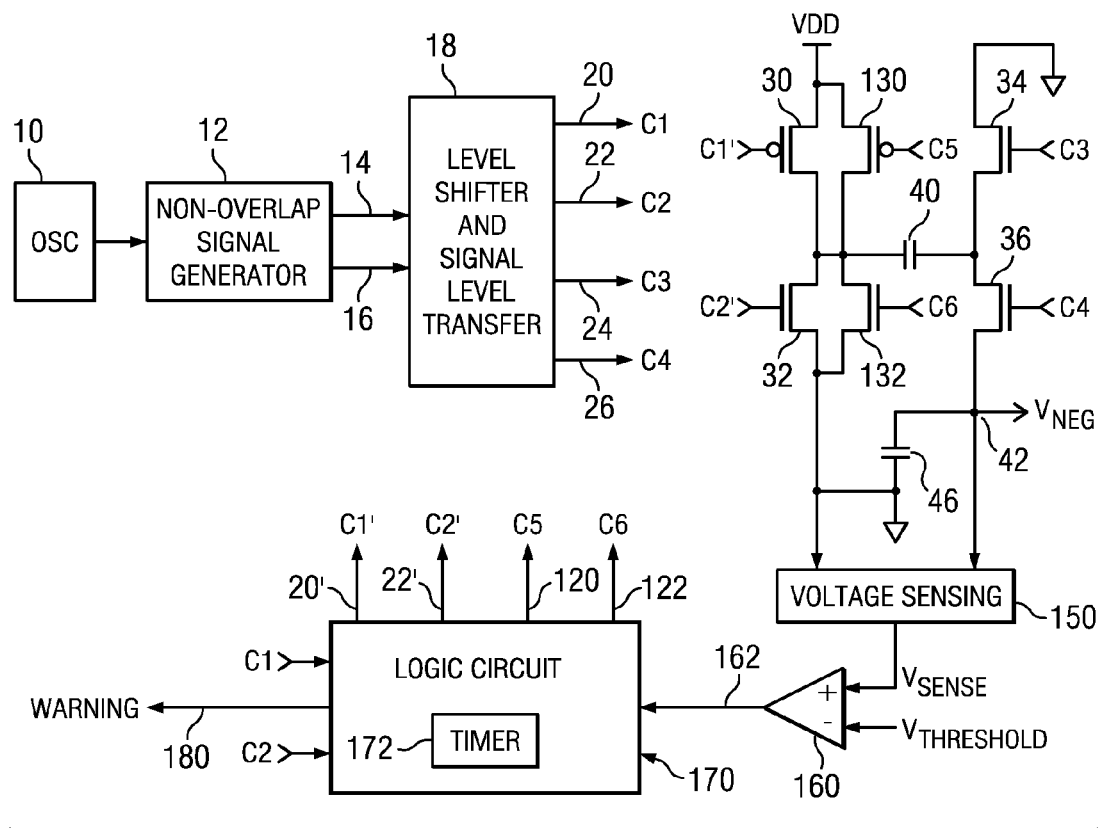
FIG. 3 is a circuit diagram for a negative charge pump circuit with current protection.

Reference is now made to FIG. 3 which shows a circuit diagram for a negative charge pump circuit 100 with current protection. The circuit 100 is configured in a manner similar to that of the circuit shown in FIG. 1. Like reference numbers refer to like or similar component parts. A repeated discussion of such components is not provided. Reference is made to the previous discussion in connection with FIG. 1.

In FIG. 3, the first MOS (power) transistor 30 receives at its gate a first control signal C1'. The second MOS (power) transistor 32 receives at its gate a second control signal C2'. In normal mode of operation, the first control signal C1' is the previously described first control signal C1 and the second control signal C2' is the previously described second control signal C2. However, in a current limited mode of operation, the first control signal C1' and second control signal C2' are set at levels (high and low, respectively) that shut off or disable operation of the first and second transistors 30 and 32. Further description of the modes of operation is provided below.

The circuit 100 further includes a fifth (small non-power) MOS transistor 130 of the PMOS type having its source terminal coupled to the reference voltage (Vdd) and its drain terminal coupled to the first terminal of the first capacitor 40 (referred to as the fly capacitor). Thus, the fifth MOS transistor 130 is connected in parallel with the first MOS transistor 30. The gate of the fifth MOS transistor 130 receives a fifth control signal (C5) 120. In normal mode of operation, the fifth control signal C5 is set at a level (high) that shuts off or disables operation of the fifth transistor 130. However, in the current limited mode of operation, the fifth control signal C5 is derived from (and more specifically is equal to) the first control signal C1, and thus the fifth MOS transistor 130 participates in the pumping operation in place of the disabled first MOS transistor 30.

The circuit 100 also includes a sixth (small non-power) MOS transistor 132 of the NMOS type having its source terminal coupled to the ground reference voltage and its drain terminal coupled to the first terminal of the first capacitor 40 (referred to as the fly capacitor). Thus, the sixth MOS transistor 132 is connected in parallel with the second MOS transistor 32. The gate of the sixth MOS transistor 132 receives a sixth control signal (C6) 122. In normal mode of operation, the sixth control signal C6 is set at a level (low) that shuts off or disables operation of the sixth transistor 132. However, in the current limited mode of operation, the sixth control signal C6 is derived from (and more specifically is equal to) the second control signal C2, and thus the sixth MOS transistor 132 participates in the pumping operation in place of the disabled second MOS transistor 32.

The circuit 100 further includes an output voltage sensing circuit 150. The sensing circuit 150 is coupled across the load capacitor 46 between the Vneg output 42 and the ground reference voltage. The circuit 150 generates an output Vsense which tracks the negative pumped output 42 voltage Vneg. Thus, as the output 42 voltage Vneg moves positively, the output Vsense moves positively. Conversely, as the output 42 voltage Vneg moves negatively, the output Vsense moves negatively.

The output Vsense from the voltage sensing circuit 150 is applied to a first (for example, positive) input of a comparator 160. The second (for example, negative) input of the comparator 160 receives a reference voltage Vthreshold. The output 162 of the comparator 160 changes state when the output Vsense exceeds the reference voltage Vthreshold. This change in state is indicative of the output 42 voltage (i.e., the negative pumped output voltage Vneg) being abnormal (for example, too positive).

Logic circuitry 170 is responsive to the output 162 of the comparator 160. In the normal mode of operation, for example when the output of the comparator 160 indicates that output 42 voltage (i.e., the negative pumped output voltage Vneg) is normal, the logic circuitry 170 enables operation of the first and second MOS (power) transistors 30 and 32 and disables operation of the fifth and sixth MOS (small) transistors 130 and 132. The first (C1) and second (C2) control signals 20 and 22 are gated through the logic circuitry 170 as the first and second control signals C1' and C2' for application to the first and second MOS (power) transistors 30 and 32. The first and second MOS (power) transistors 30 and 32 accordingly operate in connection with the first and second phases of operation for generating the negative pumped output voltage Vneg. The logic circuitry 170 further controls the fifth (C5) and sixth (C6) control signals 120 and 122 to provide gate voltages (high and low, respectively) so as to turn off the fifth and sixth MOS (small) transistors 130 and 132.

However, in the current limited mode of operation, for example when the output of the comparator 160 indicates that output 42 voltage (i.e., the negative pumped output voltage Vneg) is abnormal, the logic circuitry 170 enables operation of the fifth and sixth MOS (small) transistors 130 and 132 and disables operation of the first and second MOS (power) transistors 30 and 32. The first (C1) and second (C2) control signals 20 and 22 are gated through the logic circuitry 170 as the fifth (C5) and sixth (C6) control signals 120 and 122 for application to the fifth and sixth MOS (small) transistors 130 and 132. The fifth and sixth MOS (small) transistors 130 and 132 accordingly operate in connection with the first and second phases of operation for generating the negative pumped output voltage Vneg. The logic circuitry 170 further controls the first (C1') and second (C2') control signals to provide gate voltages (high and low, respectively) so as to turn off the first and second MOS (power) transistors 30 and 32.

The logic circuitry 170 may further generate a warning output signal 180 for use by other included circuitry (not shown). This warning output signal 180 may, for example, have a logic high state when the logic circuitry has configured the charge pump in the current limited mode of operation.

Figure 4:
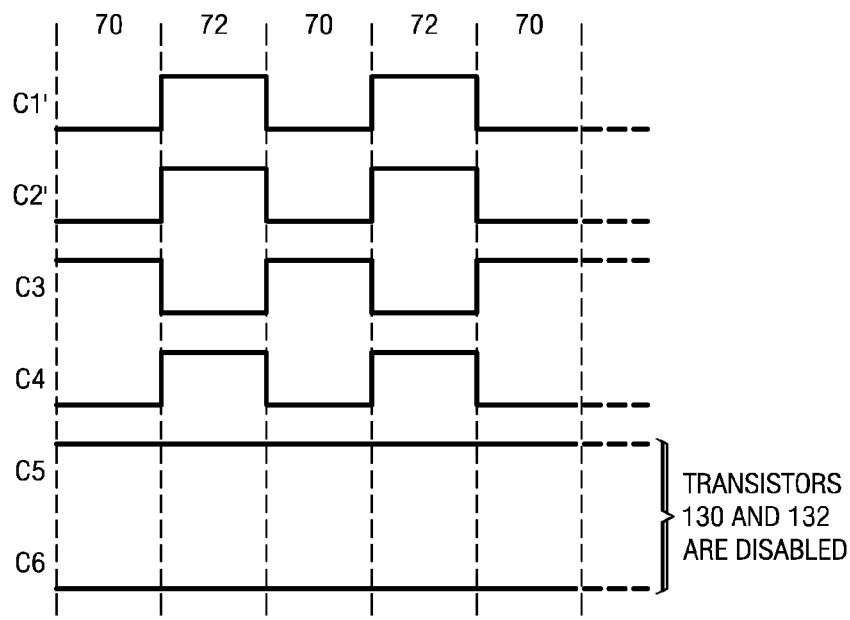
FIG. 4 is a timing diagram illustrating the control signals for the charge pump circuit of FIG. 3 during normal mode of operation.

Reference is now made to FIG. 4 which shows a timing diagram illustrating the control signals for the charge pump circuit of FIG. 3 during normal mode of operation. During the first phase of operation 70, the first (C1') and third (C3) control signals 20' and 24 turn on the first and third power transistors 30 and 34. This charges the fly capacitor 40 towards the reference voltage Vdd. In this first phase of operation, the first (C1') control signal 20' is low and the third (C3) control signal 24 is high. The second (C2') and fourth (C4) control signals 22' and 26 are both low (thus shutting off the second and fourth transistors 32 and 36). The fifth (C5) and sixth (C6) control signals are set high and low, respectively, to disable the fifth and sixth transistors 130 and 132.

During a second phase of operation 72, the second (C2') and fourth (C4) control signals 22' and 26 turn on the second and fourth power transistors 32 and 36. This charges the load capacitor 46 (with the positive side of the fly capacitor 40 being connected the ground reference side of the load capacitor 46), thus producing a negative voltage Vneg at the output 42. In this second phase of operation, the second (C2') control signal 22' is high and the fourth (C4) control signal 26 is high. The first (C1') and third (C3) control signals 20' and 24 are high and low, respectively, (thus shutting off the first and third transistors 30 and 34). The fifth (C5) and sixth (C6) control signals are set high and low, respectively, to disable the fifth and sixth transistors 130 and 132.

The first and second phases are continuously repeated to pump the output 42 at the negative voltage Vneg=−Vdd. However, load conditions may change and the output 42 voltage Vneg may rise (become more positive). This is sensed by the voltage sensing circuit 150 and comparator 160. When the sensed voltage Vsense exceeds the reference voltage Vthreshold, the comparator 160 trips. The logic circuit 170 responds to this by switching from the normal mode of operation to the current limited mode of operation.

Figure 5:
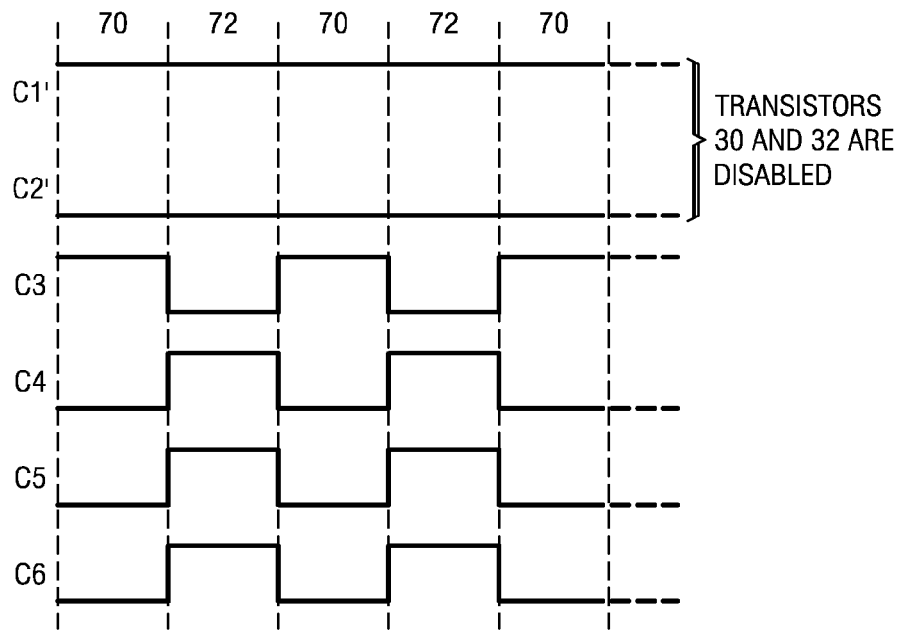
FIG. 5 is a timing diagram illustrating the control signals for the charge pump circuit of FIG. 3 during current limited mode of operation.

Reference is now made to FIG. 5 which shows a timing diagram illustrating the control signals for the charge pump circuit of FIG. 3 during current limited mode of operation. During the first phase of operation 70, the fifth (C5) and third (C3) control signals 120 and 24 turn on the fifth MOS (small) transistor 130 and the third power transistor 34. This charges the fly capacitor 40 towards the reference voltage Vdd with a low current due to the small size of the fifth MOS transistor 130. In this first phase of operation, the fifth (C5) control signal 120 is low and the third (C3) control signal 24 is high. The sixth (C6) and fourth (C4) control signals 122 and 26 are both low (thus shutting off the sixth MOS (small) transistor 132 and the fourth transistor 36). The first (C1') and second (C2') control signals are set high and low, respectively, to disable the first and second transistors 30 and 32.

During a second phase of operation 72, the sixth (C6) and fourth (C4) control signals 122 and 26 turn on the sixth MOS (small) transistor 132 and the fourth power transistor 36. This charges the load capacitor 46 (with the positive side of the fly capacitor 40 being connected the ground reference side of the load capacitor 46), thus producing a negative voltage Vneg at the output 42. In this second phase of operation, the sixth (C6) control signal 122 is high and the fourth (C4) control signal 26 is high. The fifth (C5) and third (C3) control signals 120 and 24 are high and low, respectively, (thus shutting off the fifth and third transistors 130 and 34). The first (C1') and second (C2') control signals are set high and low, respectively, to disable the first and second transistors 30 and 32.

The first and second phases are continuously repeated to pump the output 42 back towards the negative voltage Vneg=−Vdd. The logic circuit 170 includes a timer 172 which is activated by the tripping of comparator 160 and movement from the normal mode of operation to the current limited mode of operation. The logic circuitry 170 remains in the current limited mode of operation until a time period 174 (FIG. 6) measured by the timer 172 times out. At that point, the logic circuit 170 switches from the current limited mode of operation back to the normal mode of operation.

Figure 6:
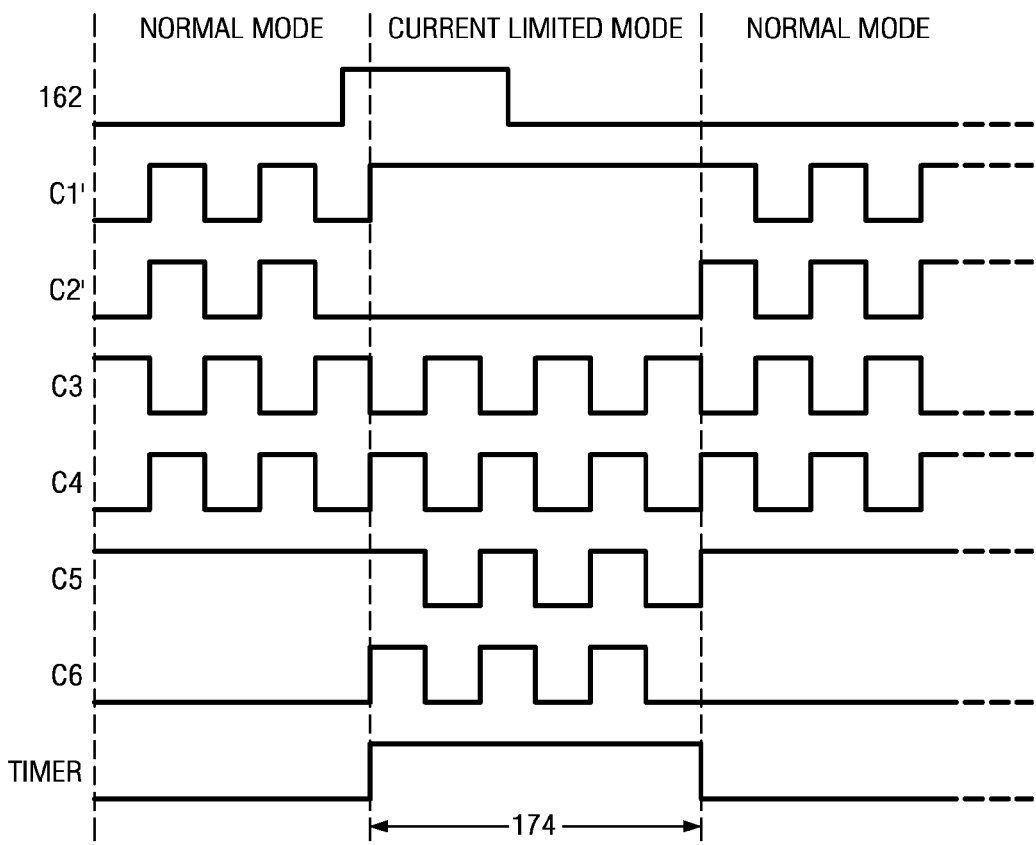
FIGS. 6 and 7 are timing diagrams showing operation of the circuit to switch between normal mode and current limited mode.

This operation is shown by the timing diagram of FIG. 6. The circuit is initially in normal mode, and thus the transistors 30, 32, 34 and 36 are involved in the pumping operation under the control of control signals C1', C2', C3 and C4. Control signals C5 and C6 are set to turn off (disable) transistors 130 and 132. The output 162 of the comparator 160 then changes state because Vneg has been sensed to have an abnormal voltage level (become more positive; Vsense>Vthreshold). Responsive thereto, the timer 172 is actuated and the logic circuit 170 transitions to the current limited mode of operation. In current limited mode, the transistors 130, 132, 34 and 36 are involved in the pumping operation under the control of control signals C5, C6, C3 and C4. Control signals C1' and C2' are set to turn off (disable) transistors 30 and 32. The pumping operation restores the negative voltage output level Vneg and the comparator 160 output 162 changes state when the Vsense>Vthreshold comparison is no longer satisfied. When the time period 174 expires, the logic circuit 170 transitions back to the normal mode of operation where the transistors 30, 32, 34 and 36 are involved in the pumping operation under the control of control signals C1', C2', C3 and C4 (and control signals C5 and C6 are set to turn off (disable) transistors 130 and 132).

In an alternative embodiment, the logic circuit 170 switches between the current limited mode of operation and the normal mode of operation responsive to the comparator 160 output (instead of the counting of the timer). The more negative movement of the output 42 voltage is sensed by the voltage sensing circuit 150 and comparator 160. When the sensed voltage Vsense falls below the reference voltage Vthreshold, the comparator 160 trips back. The logic circuit 170 responds to this by switching from the current limited mode of operation back to the normal mode of operation. It will be understood that the Vthreshold transitions causing a trip in the comparator output do not have to be same. In other words, the comparator 160 may operate with some amount of hysteresis.

Figure 7:
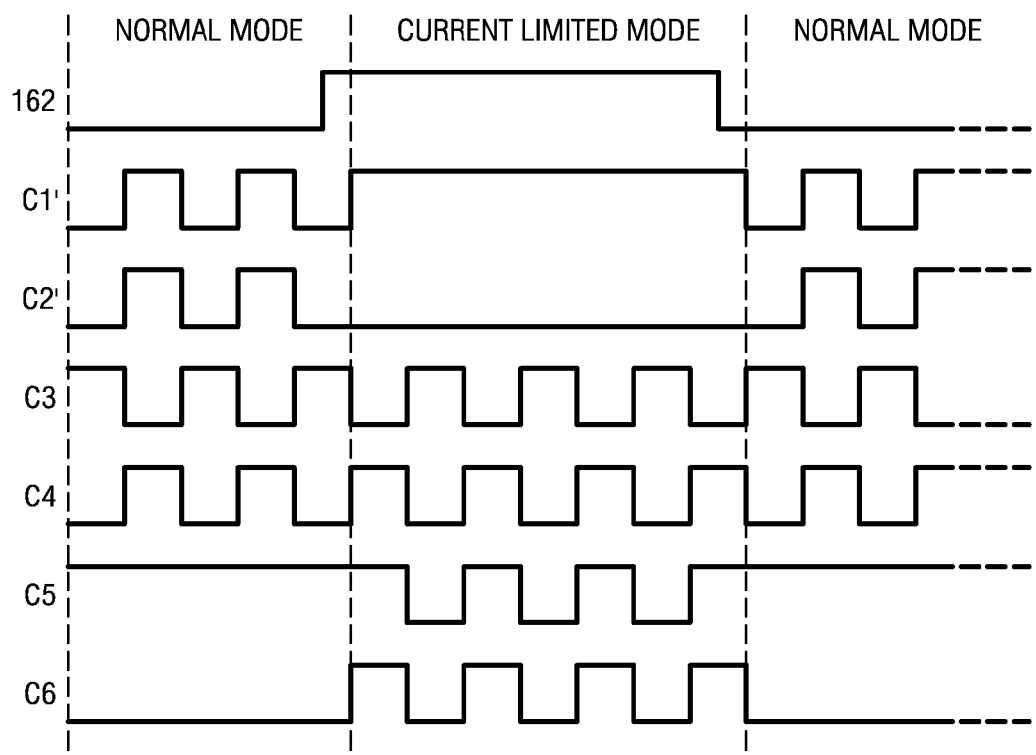

This operation is shown by the timing diagram of FIG. 7. The circuit is initially in normal mode, and thus the transistors 30, 32, 34 and 36 are involved in the pumping operation under the control of control signals C1', C2', C3 and C4. Control signals C5 and C6 are set to turn off (disable) transistors 130 and 132. The output 162 of the comparator 160 then changes state. Responsive thereto, the logic circuit 170 transitions to the current limited mode of operation. In current limited mode, the transistors 130, 132, 34 and 36 are involved in the pumping operation under the control of control signals C5, C6, C3 and C4. Control signals C1' and C2' are set to turn off (disable) transistors 30 and 32. The pumping operation restores the negative voltage output level Vneg and the comparator 160 output 162 changes state when the Vsense>Vthreshold comparison is no longer satisfied (preferably with some hysteresis effect). The logic circuit 170 then transitions back to the normal mode of operation where the transistors 30, 32, 34 and 36 are involved in the pumping operation under the control of control signals C1', C2', C3 and C4 (and control signals C5 and C6 are set to turn off (disable) transistors 130 and 132).

Figure 8:
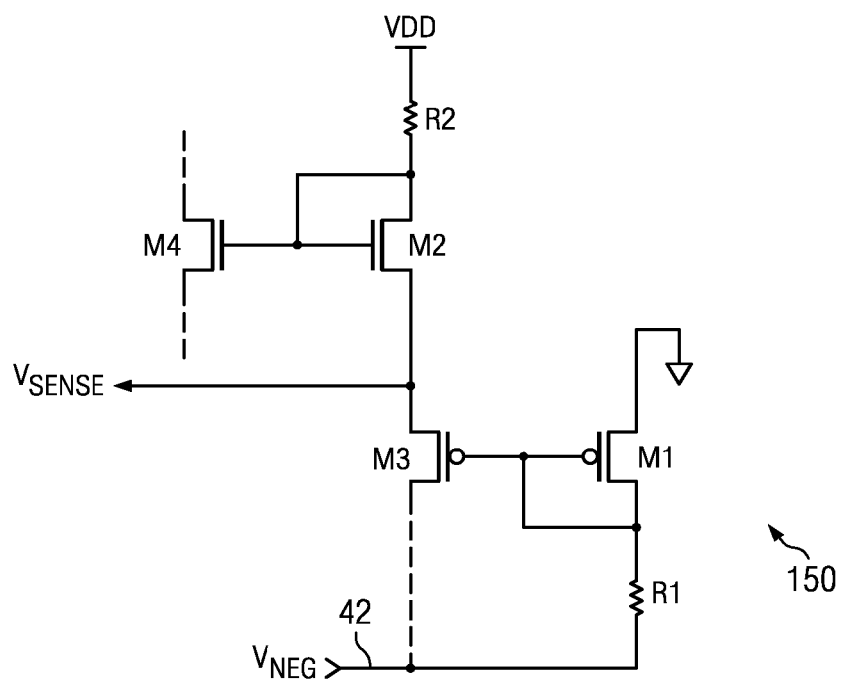
FIG. 8 is a circuit diagram of one implementation for the voltage sensing circuit used in FIG. 5.

Reference is now made to FIG. 8 which shows a circuit diagram of one implementation for the voltage sensing circuit 150. The negative voltage Vneg output 42 is connected to ground through resistor R1 and the source/drain path of PMOS transistor M1. The gate of PMOS transistor M1 is connected to the gate of PMOS transistor M3 in a current mirror-like configuration. The source/drain path of PMOS transistor M3 is connected in series with the source/drain path of NMOS transistor M2 and resistor R2. The gate of NMOS transistor M2 is connected to the gate of NMOS transistor M4 in a current mirror-like configuration. The output Vsense of the voltage sensing circuit 150 is taken at the series interconnection of the source/drain paths of PMOS transistor M3 and NMOS transistor M2. The output voltage Vsense follows the input voltage Vneg at the negative voltage output 42 in accordance with the following equation:

$$V\text{sense} = Vdd - Vthn - (Vthp + Vneg) * R1/R2$$

Figure 9:
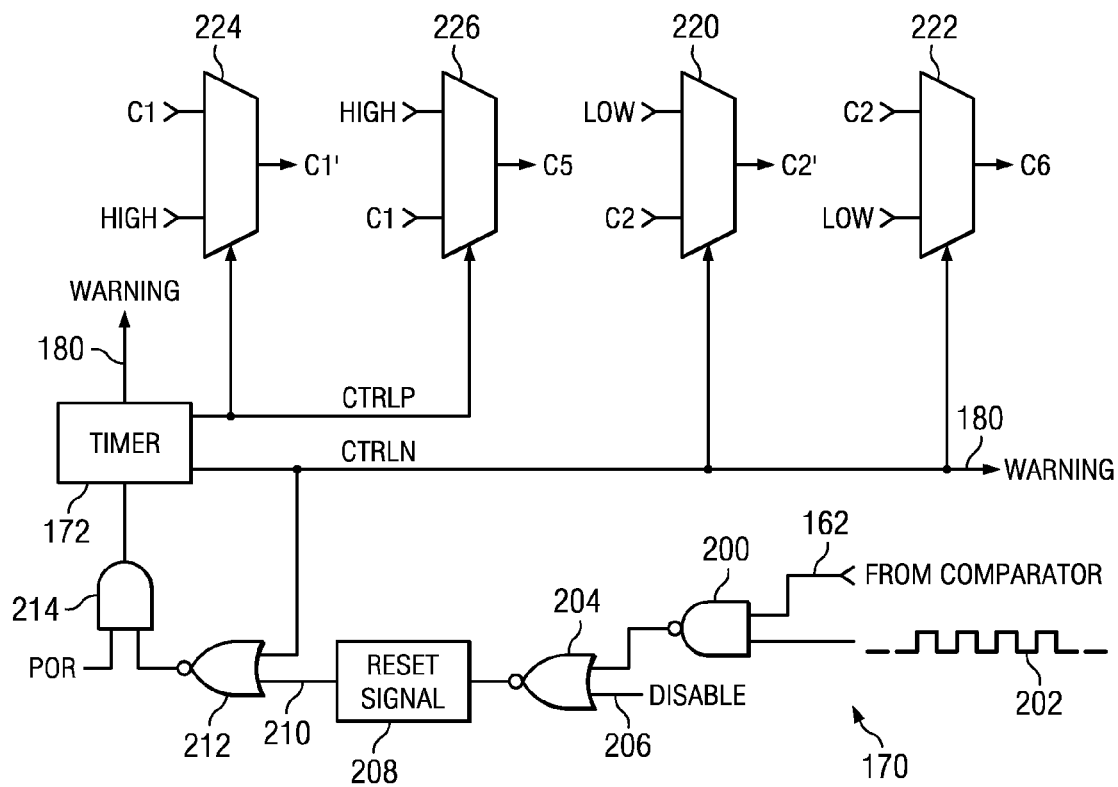
FIG. 9 is a circuit diagram of one implementation for the logic circuit used in FIG. 5 for supporting the operation illustrated in FIG. 6.

Reference is now made to FIG. 9 which shows a circuit diagram of one implementation for the logic circuit 170. The output 162 of the comparator 160 is received at the first input of a NAND gate 200. The other input of the NAND gate 200 receives a clock signal 202. The output of the NAND gate 200 is applied to the first input of a NOR gate 204. The second input of the NOR gate 204 receives a disable control signal 206. The output of the NOR gate 204 is applied to the input of a reset signal generation circuit 208.

The operation of the foregoing circuitry is as follows: the output 162 of the comparator 160 goes high when the Vthreshold comparison is satisfied. The next high pulse of clock signal 202 passes the comparator output signal through as a logic low signal output from the NAND gate 200. The NOR gate 204 passes that signal through as a logic high signal provided the disable control signal 206 is low (i.e., the operation of this circuitry is enabled). The reset generation circuit 208 responds to the logic high output of the NOR gate 204 to generate a logic low reset output 210.

Continuing with the description of FIG. 9, the output 210 of the reset generation circuit 208 is applied to a first input of a NOR gate 212. The second input of the NOR gate 212 receives a select signal CtrlN (to be described). The output of the NOR gate 212 is applied to the first input of an AND gate 214. The second input of the AND gate 214 receives a power on reset (POR) signal. The output of the AND gate 214 is applied to a control input of the timer 172. The timer 172 generates the first select signal CtrlN and a second select signal CtrlP. When the timer 172 is not counting (i.e., not timing the period 174), the first select signal CtrlN is logic low and a second select signal CtrlP is logic high. Conversely, when the timer 172 is counting (i.e., timing the period 174), the first select signal CtrlN is logic high and a second select signal CtrlP is logic low. The first select signal CtrlN is applied to the select inputs of a first multiplexer 220 (outputting the second (C2') control signal) and second multiplexer 222 (outputting the sixth (C6) control signal). The second select signal CtrlP is applied to the select inputs of a third multiplexer 224 (outputting the first (C1') control signal) and fourth multiplexer 226 (outputting the fifth (C5) control signal). The first multiplexer 220 receives a first input which is logic low and a second input of the second (C2) control signal. The second multiplexer 222 receives a first input of the second (C2) control signal and a second input which is logic low. The third multiplexer 224 receives a first input of the first (C1) control signal and a second input which is logic high. The fourth multiplexer 226 receives a first input which is logic high and a second input of the first (C1) control signal.

The operation of the foregoing circuitry is as follows: when the timer 172 is not counting, the first select signal CtrlN is logic low and a second select signal CtrlP is logic high. This corresponds to normal mode of operation. With the first select signal CtrlN at logic low, the first multiplexer 220 passes second control signal (C2) to its output producing the second control signal C2' and the second multiplexer 222 passes a logic low signal as the sixth control signal C6. With the second select signal CtrlP at logic high, the third multiplexer 224 passes first control signal (C1) to the output producing control signal C1' and the fourth multiplexer 226 passes a logic high signal as the fifth control signal C5. Thus, the logic circuit 170 produces signals C2'=C2, C6=logic low, C1'=C1 and C5=logic high. In this mode, the transistors 30, 32, 34 and 36 function in the pumping operation to produce the negative output Vneg=−Vcc.

While the first select signal CtrlN is logic low (because the timer 172 is not counting), the receipt of the logic low reset pulse output 210 generates a logic high signal at the output of the NOR gate 212. Thus, when the timer 172 is not counting, the logic high output 162 of the comparator 160 (when Vthreshold is exceeded) produces the logic high output of the NOR gate 212. If the POR signal is logic high (indicating that POR is completed) and the NOR gate 212 is generating a logic high output (in response to the logic high output 162 of the comparator 160), then the output of the AND gate 214 is logic high triggering the timer 172 to begin counting. At this point, the mode of operation switches to the current limited mode of operation.

When the timer 172 is counting (i.e., timing the period 174), the first select signal CtrlN is logic high and the second select signal CtrlP is logic low. Because the first select signal CtrlN is logic high, the logic high output 162 of the comparator 160 is blocked by the NOR gate 212 from producing a logic high signal at the output of the NOR gate 212. This prevents the clocked logic high output 162 of the comparator 160 from resetting the timer 172.

With the first select signal CtrlN at logic high, the first multiplexer 220 passes a logic low signal as the second control signal C2' and the second multiplexer 222 passes the second control signal (C2) to its output producing the sixth control signal C6. With the second select signal CtrlP at logic low, the third multiplexer 224 passes a logic high signal as the first control signal C1' and the fourth multiplexer 226 passes the first control signal (C1) to the output as the fifth control signal C5. Thus, the logic circuit 170 produces signals C2'=logic low, C6=C2, C1'=logic high C1 and C5=C1. In this mode, the transistors 130, 132, 34 and 36 function in the pumping operation to produce the negative output Vneg=−Vcc.

When the counter 172 determines that the time period 174 has expired, the logic circuit 170 transitions back to the normal mode of operation. As discussed above, when in normal mode of operation the first select signal CtrlN is logic low and a second select signal CtrlP is logic high. This re-enables the NOR gate 212 to pass the signal 210 output from the reset signal generator 208 in response to the logic high output 162 of the comparator 160. The first select signal CtrlN being logic low further controls the first and second multiplexers 220 and 222 to produce signals C2'=C2 and C6=logic low. The second select signal CtrlP being logic high further controls the third and fourth multiplexers 224 and 226 to produce signals C1'=C1 and C5=logic high. In this mode, the transistors 30, 32, 34 and 36 function in the pumping operation to produce the negative output Vneg=−Vcc.

With respect to the warning output signal 180, there are a number of alternatives available for generating this signal. In one embodiment, the warning output signal 180 is generated by the timer 172 when the mode of operation switches from normal to current limited. In another embodiment, the warning output signal is, or is triggered by, the state of one of the select signals CtrlN or CtrlP.

Figure 10:
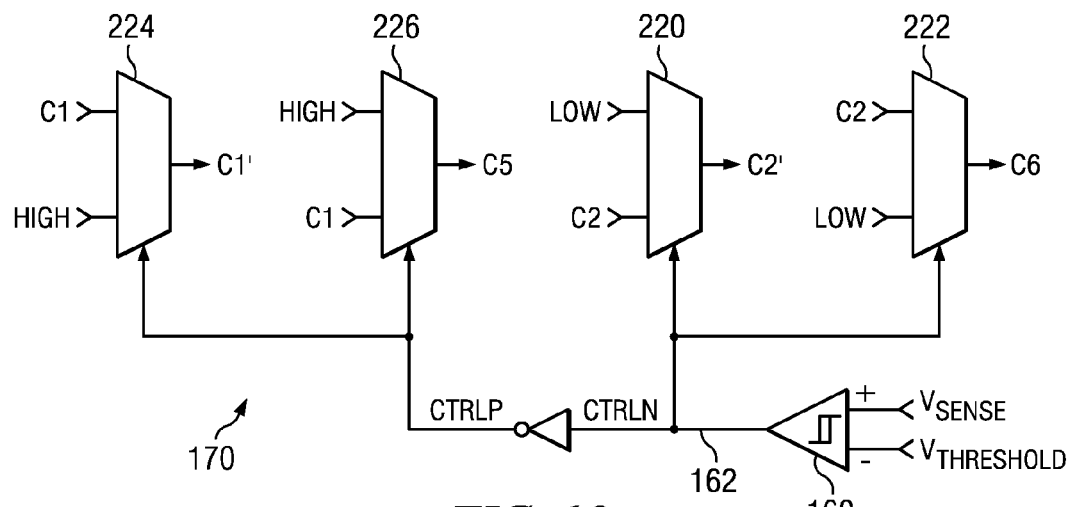
FIG. 10 is a circuit diagram of another implementation for the logic circuit used in FIG. 5 for supporting the operation illustrated in FIG. 7.

Reference is now made to FIG. 10 wherein there is shown a circuit diagram of another implementation for the logic circuit 170. In this implementation, the comparator 160 is a hysteresis comparator. The two trip points for this comparator 160 are set relative to a single reference voltage Vthreshold. It will be understood that the comparator 160 could alternatively receive first and second reference voltages, if desired, for defining the trip points.

When Vsense is less than the reference voltage for the first trip point the output of the comparator 160 is logic low. This corresponds to the normal mode of operation where the first select signal CtrlN is logic low and a second select signal CtrlP is logic high. With the first select signal CtrlN at logic low, the first multiplexer 220 passes the second control signal (C2) to its output producing the second control signal C2' and the second multiplexer 222 passes a logic low signal to its output producing the sixth control signal C6. With the second select signal CtrlP at logic high, the third multiplexer 224 passes the first control signal (C1) to the output as the first control signal C1' and the fourth multiplexer 226 passes a logic high signal as the fifth control signal C5. Thus, the logic circuit 170 produces signals C2'=C2, C6=logic low, C1'=C1 and C5=logic high. In this mode, the transistors 30, 32, 34 and 36 function in the pumping operation to produce the negative output Vneg=−Vcc.

When Vsense exceeds the reference voltage for the first trip point the output of the comparator 160 is logic high. This corresponds to the current limited mode of operation where the first select signal CtrlN is logic high and a second select signal CtrlP is logic low. With the first select signal CtrlN at logic high, the first multiplexer 220 passes a logic low signal as the second control signal C2' and the second multiplexer 222 passes the second control signal (C2) to its output producing the sixth control signal C6. With the second select signal CtrlP is logic low, the third multiplexer 224 passes a logic high signal as the first control signal C1' and the fourth multiplexer 226 passes the first control signal (C1) to the output as the fifth control signal C5. Thus, the logic circuit 170 produces signals C2'=logic low, C6=C2, C1'=logic high and C5=C1. In this mode, the transistors 130, 132, 34 and 36 function in the pumping operation to produce the negative output Vneg=−Vcc.

When Vsense is less than the reference voltage for the second (hysteretic) trip point the output of the comparator 160 is logic low. This corresponds to the normal mode of operation where the first select signal CtrlN is logic low and a second select signal CtrlP is logic high. As discussed above, the logic circuit 170 produces signals C2'=C2, C6=logic low, C1'=C1 and C5=logic high in the normal mode of operation. In this mode, the transistors 30, 32, 34 and 36 function in the pumping operation to produce the negative output Vneg=−Vcc.

While the foregoing discussion has emphasized operation in the context of normal working operation of the charge pump, it will be understood that the switching operations described herein are equally applicable to power-up. Thus, the logic circuitry 170 can be configured responsive to a power up condition to first enter the current limited mode of operation. Only after power-up is completed and the negative output voltage Vneg has reached a normal state will the logic circuitry 170 switch to the normal mode of operation.

In an embodiment, the charge pump described herein is used to generate the negative supply voltage Vneg for an audio amplifier application. In this application it is undesirable to pump with high current (i.e., normal mode) in response to loading which causes Vneg to become more positive. One reason for this is that normal mode pumping causes a large transient current which can be harmful to the output switch MOS transistors and metal connections of the audio amplifier. Additionally, immunity from latchup cannot be guaranteed when pumping Vneg with high current. So, it is preferred to instead pump more slowly thus providing a softer recovery of Vneg towards −Vdd.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit comprising:
a charge pump circuit including a first power transistor configured to be selectively actuated by a first control signal to deliver relatively higher amounts of current to a capacitor, the charge pump circuit further including a second non-power transistor connected in parallel with the first power transistor and configured to be selectively actuated by a second control signal to deliver relatively lower amounts of current to the capacitor, the charge pump circuit including a pumped voltage output;
a voltage sensing circuit configured to sense the pumped voltage output and generate a sensed voltage output;
a comparison circuit configured to compare the sensed voltage output to a threshold voltage;
a logic circuit coupled to receive an output of the comparison circuit, the logic circuit configured to enable the first power transistor and disable the second non-power transistor if the comparison is not satisfied, and further configured to disable the first power transistor and enable the second non-power transistor if the comparison is satisfied;
wherein the logic circuit further includes a timer, the timer configured to count a time period starting in response to the comparison being satisfied where the logic circuit disables the first power transistor and enable the second non-power transistor, the logic circuit further configured to enable the first power transistor and disable the second non-power transistor when the time period expires.

2. The circuit of claim 1 wherein the capacitor is a flying capacitor of the charge pump circuit.

3. The circuit of claim 1 wherein the capacitor is a load capacitor of the charge pump circuit.

4. The circuit of claim 1 wherein the charge pump circuit is a negative charge pump.

5. The circuit of claim 1 wherein the first and second control signals are one phase of a non-overlapping oscillation signal, the logic circuit selectively passing the non-overlapping oscillation signal to the first power transistor when the first power transistor is enabled, and the logic circuit selectively passing the non-overlapping oscillation signal to the second non-power transistor when the second non-power transistor is enabled.

6. The circuit of claim 1 wherein the comparison circuit is a hysteresis comparator, the logic circuit further configured to enable the first power transistor and disable the second non-power transistor if the comparison including some hysteresis is subsequently not satisfied.

7. A method comprising:
pumping an output to a pumped voltage level, wherein pumping comprises selectively delivering current to a capacitor through either a first power transistor which delivers relatively higher amounts of current to the capacitor or a second non-power transistor which delivers relatively lower amounts of current to the capacitor;
sensing the pumped voltage level and generating a sensed voltage output;
comparing the sensed voltage output to a threshold voltage;
enabling the first power transistor and disabling the second non-power transistor if the comparison is not satisfied;
disabling the first power transistor and enabling the second non-power transistor if the comparison is satisfied; and
timing a time period starting in response to the comparison being satisfied where the first power transistor is disabled and the second non-power transistor is enabled, and further comprising enabling the first power transistor and disabling the second non-power transistor when the time period expires.

8. The method of claim 7 wherein the capacitor is a flying capacitor of the charge pump circuit.

9. The method of claim 7 wherein the capacitor is a load capacitor of the charge pump circuit.

10. The method of claim 7 wherein the pumped voltage level is a negative voltage level.

11. The method of claim 7 wherein comparing comprises comparing with hysteresis, and further comprising enabling the first power transistor and disabling the second non-power transistor if the comparison including some hysteresis is subsequently not satisfied.

12. A circuit comprising:
a charge pump circuit including:
a first power transistor configured to be selectively actuated by a first control signal to deliver relatively higher amounts of current to a first capacitor;
a second power transistor configured to be selectively actuated by a second control signal to deliver relatively higher amounts of current from the first capacitor to a second capacitor;
a third non-power transistor connected in parallel with the first power transistor and configured to be selectively actuated by a third control signal to deliver relatively lower amounts of current to the first capacitor;
a fourth non-power transistor connected in parallel with the second power transistor and configured to be selectively actuated by a fourth control signal to deliver relatively lower amounts of current from the first capacitor to the second capacitor; and
a pumped voltage output coupled to the second capacitor;
a voltage sensing circuit configured to sense the pumped voltage output and generate a sensed voltage output;
a comparison circuit configured to compare the sensed voltage output to a threshold voltage;
a logic circuit operable to configure the charge pump for operation in a first mode of operation and second mode of operation responsive to an output of the comparison circuit, the first mode of operation enabling the first and second power transistors and disabling the third and fourth non-power transistors when the comparison is not satisfied, and the second mode of operation disabling the first and second power transistors and enabling the third and fourth non-power transistors if the comparison is satisfied;
wherein the logic circuit further includes a timer, the timer configured to count a time period starting when the second mode of operation is enabled, the logic circuit further configured to return from the second mode of operation to the first mode of operation when the time period expires.

13. The circuit of claim 12 wherein the first capacitor is a flying capacitor of the charge pump circuit and the second capacitor is a load capacitor of the charge pump circuit.

14. The circuit of claim 12 wherein the charge pump circuit is a negative charge pump.

15. The circuit of claim 12 wherein the comparison circuit is a hysteresis comparator, the logic circuit further configured to return from the second mode of operation to the first mode of operation if the comparison including some hysteresis is subsequently not satisfied.

16. The circuit of claim 12 wherein the logic circuit is further configured to return from the second mode of operation to the first mode of operation if the comparison is subsequently not satisfied.

17. The circuit of claim 12 wherein the first and third control signals are one phase of a non-overlapping oscillation signal, the logic circuit selectively passing the non-overlapping oscillation signal to the first power transistor when the first power transistor is enabled in the first mode of operation, and the logic circuit selectively passing the non-overlapping oscillation signal to the third non-power transistor when the third non-power transistor is enabled in the second mode of operation.

18. The circuit of claim 12 wherein the second and fourth control signals are one phase of a non-overlapping oscillation signal, the logic circuit selectively passing the non-overlapping oscillation signal to the second power transistor when the second power transistor is enabled in the first mode of operation, and the logic circuit selectively passing the non-overlapping oscillation signal to the fourth non-power transistor when the fourth non-power transistor is enabled in the second mode of operation.

19. The circuit of claim 12 wherein the first, second, third and fourth control signals are one phase of a non-overlapping oscillation signal, the logic circuit selectively passing the non-overlapping oscillation signal to the first and second power transistors when the first and second power transistors are enabled in the first mode of operation, and the logic circuit selectively passing the non-overlapping oscillation signal to the third and fourth non-power transistors when the third and fourth non-power transistors are enabled in the second mode of operation.

20. The circuit of claim 1 wherein the logic circuit is configured to disable the respective power or non-power transistor by applying a fixed voltage to a control terminal of the power or non-power transistor which causes the power or non-power transistor to be turned off.

21. The method of claim 7 wherein disabling the respective power or non-power transistor comprises applying a fixed voltage to a control terminal of the power or non-power transistor which causes the power or non-power transistor to be turned off.

22. The circuit of claim 12 wherein the logic circuit is configured to disable the respective power or non-power transistor by applying a fixed voltage to a control terminal of the power or non-power transistor which causes the power or non-power transistor to be turned off.

* * * * *